(12) United States Patent
Hagerman et al.

(10) Patent No.: US 7,970,348 B2
(45) Date of Patent: Jun. 28, 2011

(54) TWO FIXED-BEAMS TX-DIVERSITY

(75) Inventors: Bo Hagerman, Stockholm (SE); Bjorn Gunnar Johannison, Kungsbacka (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 406 days.

(21) Appl. No.: 10/496,644

(22) PCT Filed: Nov. 1, 2002

(86) PCT No.: PCT/SE02/01983
§ 371 (c)(1),
(2), (4) Date: May 25, 2004

(87) PCT Pub. No.: WO03/047027
PCT Pub. Date: Jun. 5, 2003

(65) Prior Publication Data
US 2005/0063342 A1 Mar. 24, 2005

(30) Foreign Application Priority Data
Nov. 29, 2001 (SE) ....................................... 0104012

(51) Int. Cl.
*H04W 4/00* (2009.01)
(52) U.S. Cl. .... 455/25; 455/403; 455/414.1; 455/562.1; 370/203; 370/339
(58) Field of Classification Search .................. 370/203, 370/339; 455/25, 63.4, 403, 414.1, 562.1
See application file for complete search history.

(56) References Cited

U.S. PATENT DOCUMENTS
5,649,287 A * 7/1997 Forssen et al. ................ 370/312
5,933,421 A 8/1999 Alamont
(Continued)

FOREIGN PATENT DOCUMENTS
EP 07796024 9/1997
(Continued)

OTHER PUBLICATIONS
PCT Written Opinion for PCT/SE02/01983.
(Continued)

*Primary Examiner* — Charles N Appiah
*Assistant Examiner* — Jaime M Holliday
(74) *Attorney, Agent, or Firm* — Nixon & Vanderhye, P.C.

(57) ABSTRACT

A solution is disclosed for minimizing the amount of hardware and hardware accuracy requirements to simultaneously give the feature of both cell and narrow beams transmission, while enabling methods for capacity/coverage increase. The main property utilized by the present invention for maintaining cell-coverage pattern control, when radiating information in two simultaneous beams, is to use orthogonal polarization states for the two beams. The two orthogonal polarization states may for instance constitute linear polarization slanted at +45° and −45°, respectively. The dedicated broadcast transmission needs to be conveyed defining the total cell coverage area. The total cell coverage area is matched by the coverage of the two fixed narrow-beams. The broadcast signal transmission is divided into two signal streams/paths, one for each of the two fixed narrow-beams (no coherency requirements existing between the two parallel signal streams/paths). The two broadcast signal streams/paths are combined by means of combiner units with the dedicated combined signals from all fixed narrow-beam selected users in each of the two branches. The signals to the two antennas are then transmitted having an orthogonal polarization.

21 Claims, 9 Drawing Sheets

U.S. PATENT DOCUMENTS

| | | | |
|---|---|---|---|
| 5,966,094 A * | 10/1999 | Ward et al. | 342/373 |
| 6,006,069 A | 12/1999 | Langston | |
| 6,094,165 A | 7/2000 | Smith | |
| 6,101,174 A | 8/2000 | Langston | |
| 6,218,987 B1 * | 4/2001 | Derneryd et al. | 342/373 |
| 6,788,250 B2 * | 9/2004 | Howell | 342/372 |
| 6,982,968 B1 * | 1/2006 | Barratt et al. | 370/328 |
| 7,019,710 B1 * | 3/2006 | Shurvinton et al. | 343/853 |
| 7,027,837 B1 * | 4/2006 | Uhlik et al. | 455/562.1 |

FOREIGN PATENT DOCUMENTS

| | | |
|---|---|---|
| EP | 0895436 | 2/1999 |
| WO | WO 95-34102 | 12/1995 |
| WO | WO 9534102 A1 * | 12/1995 |
| WO | WO 01/89030 * | 11/2001 |
| WO | WO 02/32013 | 4/2002 |

OTHER PUBLICATIONS

International Search Report for PCT/SE02/01983.

EP Communication Pursuant to Article 94(3) EPC mailed Jan. 3, 2008 in corresponding EP Application 02780243.8.

English translation of the Second Chinese Office Action mailed May 23, 2008 in corresponding Chinese application 02823775.7.

Chinese Patent Office action mailed Apr. 3, 2009 for corresponding Chinese patent application 02823775.7.

EP Communication mailed Jan. 4, 2010 in corresponding EP application 02780243.8.

Indian First Examination Report mailed Apr. 30, 2010 in corresponding Indian application 1378/DELNP/2004.

* cited by examiner

TWO FIXED-BEAMS TX-DIVERSITY

This application is the US national phase of international application PCT/SE02/01983, filed in English on 1 Nov. 2002, which designated the US. PCT/SE02/01983 claims priority to SE Application No. 0104012-0 filed 29 Nov. 2001. The entire contents of these applications are incorporated herein by reference.

TECHNICAL FIELD

The present invention relates to a method and an apparatus for simultaneous transmitting diversity signals into a cell of a cellular system having narrow beams utilizing non-coherent signal paths.

BACKGROUND

Up to now cellular systems have base stations using omni-radiating antennas or antennas radiating in a sector (typically 120° coverage per sector). The antennas cover the whole cell and no knowledge of the position of the mobiles is used.

To increase the coverage and capacity of future systems, large efforts have been put into development of transmit diversity (TX-div) schemes/systems using multiple antenna units. TX-div utilizes multiple signal source generation to be transmitted via more-or-less independent (non-correlated) propagation channels to the receiver. The aim is to improve the reception of the received total signal quality. This is commonly obtained through coherent combining of the several source signals.

Different TX-div methods/schemes commonly put different hardware (HW) requirements on the radiated signals and their relative behavior. These requirements can usually be associated to the relative time, phase and/or amplitude of the radiated signals.

Another method to create capacity/coverage increase in conventional cellular systems, is to use adaptive antenna arrays at the Radio Base Station (RBS).

The narrow-beams created by beam forming in the adaptive antenna system can be used to increase the coverage by directivity and to reduce the interference in both the uplink and the downlink. Thus, the idea is to avoid distributed energy which no one can make use of, i.e. minimizing the interference in the system. In the cellular systems both broadcast information (i.e. information addressed to all users in the coverage area) and dedicated information (i.e. information to a specific mobile terminal) are transmitted simultaneously from an RBS.

Simultaneous transmission in several beams requires coherent signal paths from the creation of the signal up to the antenna, including feeder cable coherency or by additional signal and antenna hardware. The signal coherency may set a number of requirements on the implemented system hardware, not necessarily the same hardware requirements as for the TX-div.

Increasing the coverage and capacity through TX-div schemes involves multiple signal source generation transmitted via in principle non-correlated propagation channels to the receiver. To achieve this, multiple antenna units are used. The most common configuration to be proposed is a set-up having two identical antennas separated by a distance sufficiently large. The two antennas illuminate a coverage area, which in principle is the same for both antennas, see for instance FIG. 1.

Different methods can be used to support the identification and/or combination of the source signals, e.g. delay diversity, frequency diversity, polarization diversity, different identifier (code) for signal acquisition and combination, feedback correction (i.e. receiver measurements communicated back to the transceiver for correction of transmitted signals).

In all common cellular systems (GSM, Global System for Mobile telecommunications; PDC Pacific Digital Cellular system; TDMA-IS136 Time Division Multiple Access; EDGE Enhanced Data rates for Global Evolution; UMTS Universal Mobile Telecommunications System) the TX-div is proposed/used in the downlink, i.e. multiple source signals from the base station are transmitted towards the mobile receiver.

For example in the Universal Mobile Telecommunications System Frequency Division Duplex (UMTS-FDD) (WCDMA, Wideband Code Division Multiple Access) there are several TX-div modes defined in the standard [1] as the open-loop Space Time Transmit Diversity (STTD), closed-loop model and mode2. The mentioned WCDMA TX-div modes above are regarding configurations and schemes utilizing two TX-div branches. In the future it may be standardized even schemes for higher order number of TX-div branches.

In these schemes, there are rather strict requirements on the relative phase, amplitude and/or time accuracy between the signal paths in the TX-div transmission branches To utilize the potential performance (capacity/coverage) advantages of multi-beam, especially for two fixed-beams as a TX-div solution, requires simultaneous transmission for both cell and narrow beam coverage. A number of issues that must be fulfilled for a cost-effective system have been identified:

Less or equal amount of hardware resources should be required as for a conventional TX-div system with two sector coverage antennas. Specifically, for UMTS-FDD (WCDMA), there shall be no change of RBS (Node B) hardware configuration for TX-div, except antenna hardware and mounting. Requirements on components and/or subsystems must not be increased.

In order not to introduce additional complexity it is required that no additional coherency requirements are introduced in the system. In general, due to vector addition of transmitted signals, simultaneous transmission in two beams requires coherent signal paths from the creation of signals up to the antenna, including feeder cable coherency. Otherwise the radiation pattern will be uncontrolled and can have significant variations, including possible directions with nulls in the radiation pattern. Such coherent signal paths are very delicate to achieve in an installed product with several years of expected lifetime. That kind of solution will include calibration loops and control functions that are expensive to introduce in the system. The issue is to create the coherent antenna system behavior without requiring signal coherency.

Capacity/Coverage: The solution must not limit the possibility to utilize the full potential of the Two Fixed-Beam TX Diversity system. The potential of such a system is expected to achieve better performance than a conventional TX-div system.

No standardization changes are desired: One major requirement is that no interaction with the mobile/terminal is allowed outside the standard protocol. The solution should be transparent to the system.

SUMMARY

A novel solution is proposed minimizing the amount of hardware and hardware accuracy requirements, which simultaneously gives the feature of both cell and narrow-beams transmission, while enabling methods for capacity/coverage increase.

The main property utilized for maintaining cell-coverage pattern control, when radiating information in two simultaneous beams, is to use orthogonal polarization states for the two beams. The two orthogonal polarization states may for instance constitute linear polarization slanted at +45.degree. and −45.degree., respectively.

The dedicated beam transmission, broadcast transmission needs to be conveyed defining the total cell coverage area. The total cell coverage area is matched by the coverage of the two fixed narrow-beams. The broadcast signal transmission is divided into the signal streams/paths, one for each of two fixed narrow-beams (no coherency requirements existing between the two parallel signal streams/paths). The two broadcast signal streams/paths are combined by means of combiner units with the dedicated combined signals from all fixed narrow-beam selected users in each of the two branches. The signals to the two antennas are then transmitted having an orthogonal polarization. An alternative solution is to combine dedicated user signals selected for transmission over the specific fixed narrow-beam together with an associated broadcast signal stream in the same combiner unit.

SHORT DESCRIPTION OF THE DRAWINGS

The invention will be further described by making reference to the attached drawings in which.

DETAILED DESCRIPTION

Hardware requirements on TX-div as described here are limited to two transmit signal paths/branches, with no need for a separate broadcast transmission signal path.

The capacity/coverage improvement using adaptive antennas are previously described in a number of documents [2], [3], [4] referenced below. Without changing the cellular basestation grid including its sector coverage layout, the interference level in the system may be reduced (less interference is received and spatial spread out) by utilizing beam-forming methods with narrow-beams based on knowledge of the actual positions of the mobiles.

Simultaneous transmission in several beams of present multi-beam base station, antenna configurations requires coherent signal paths from the signals creation up to the antenna, including feeder cable coherency. The coherency is required for control of antenna pattern characteristics when transmission is directed to more than one beam. This may be solved by including calibration networks, which keep track of signal paths and of algorithms, which compensate for inaccuracies and variations. Another alternative for broadcast transmission is through a separate antenna system.

In all previously presented solutions the amount of hardware and/or hardware requirements has been increased in order to facilitate transmission of broadcast information (cell coverage beam).

Figure 1:
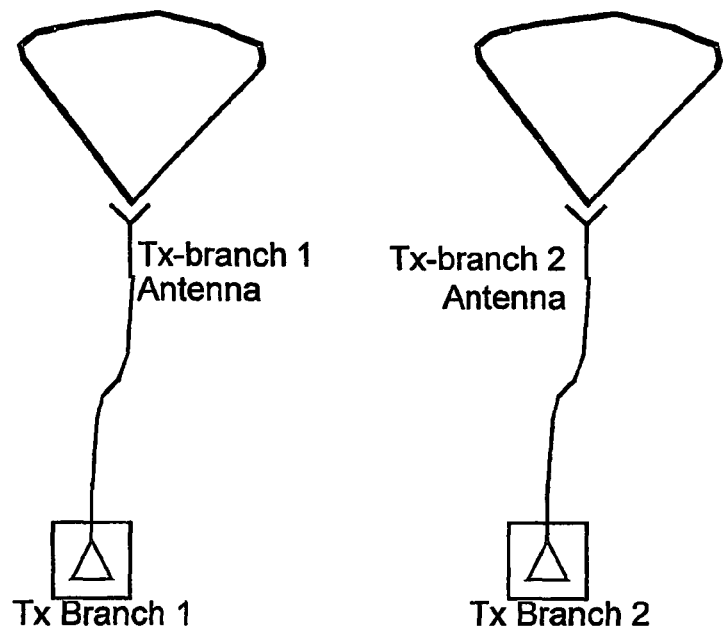
FIG. 1 shows a block diagram of a TX-div antenna configuration wherein the two antennas are separated by a sufficiently large distance and covering mainly the same area.
Figure 2:
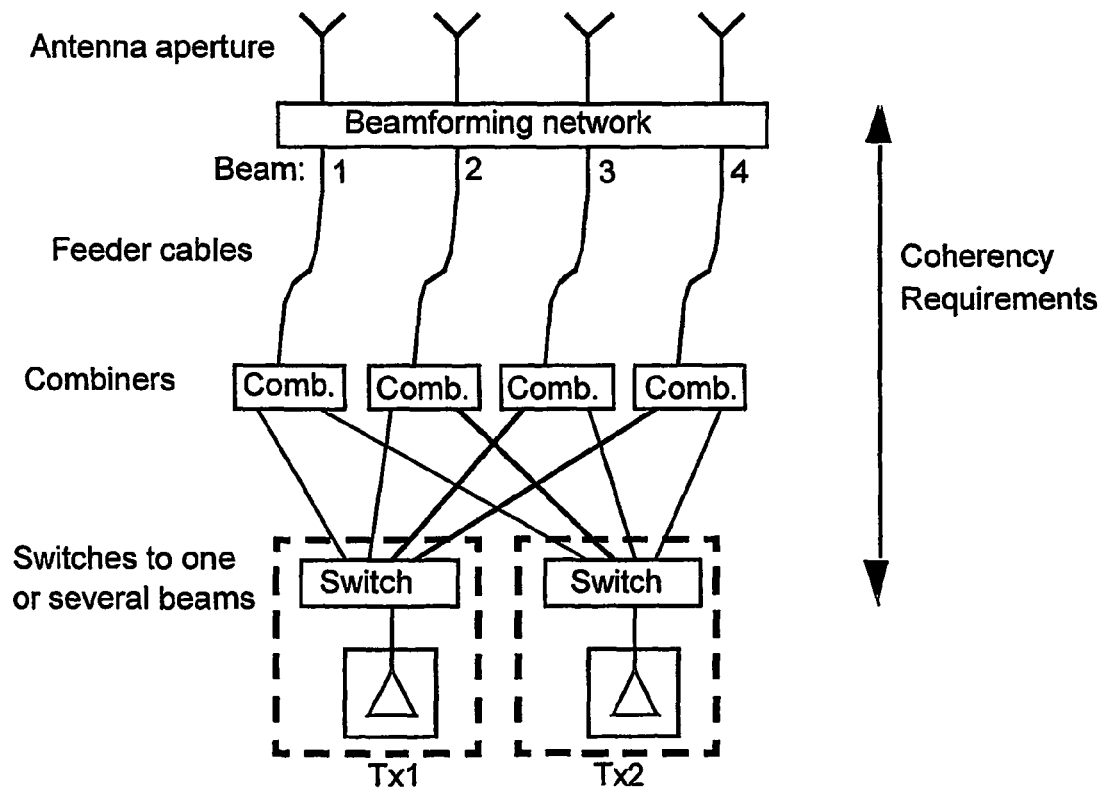
FIG. 2 shows a block diagram of multi-beam array with switched beam ports.
Figure 3:
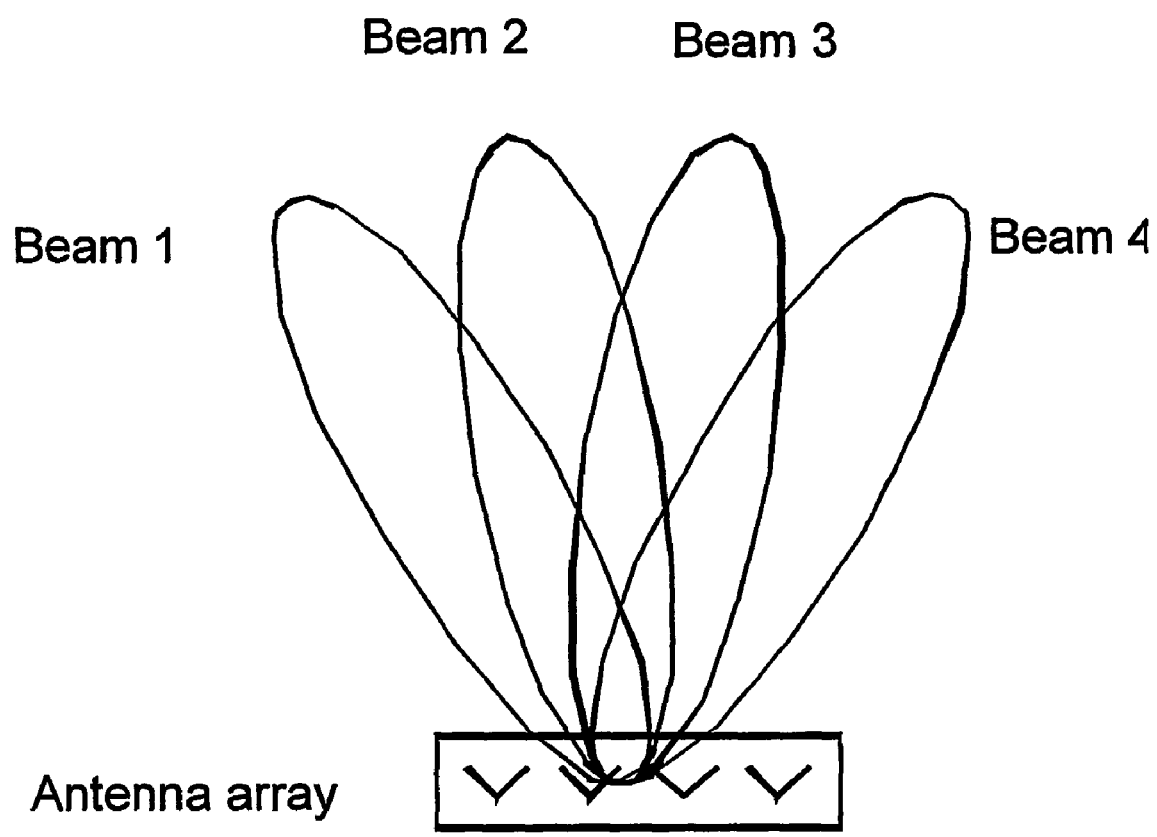
FIG. 3 illustrates a beam configuration from a conventional beam-forming array.
Figure 4:
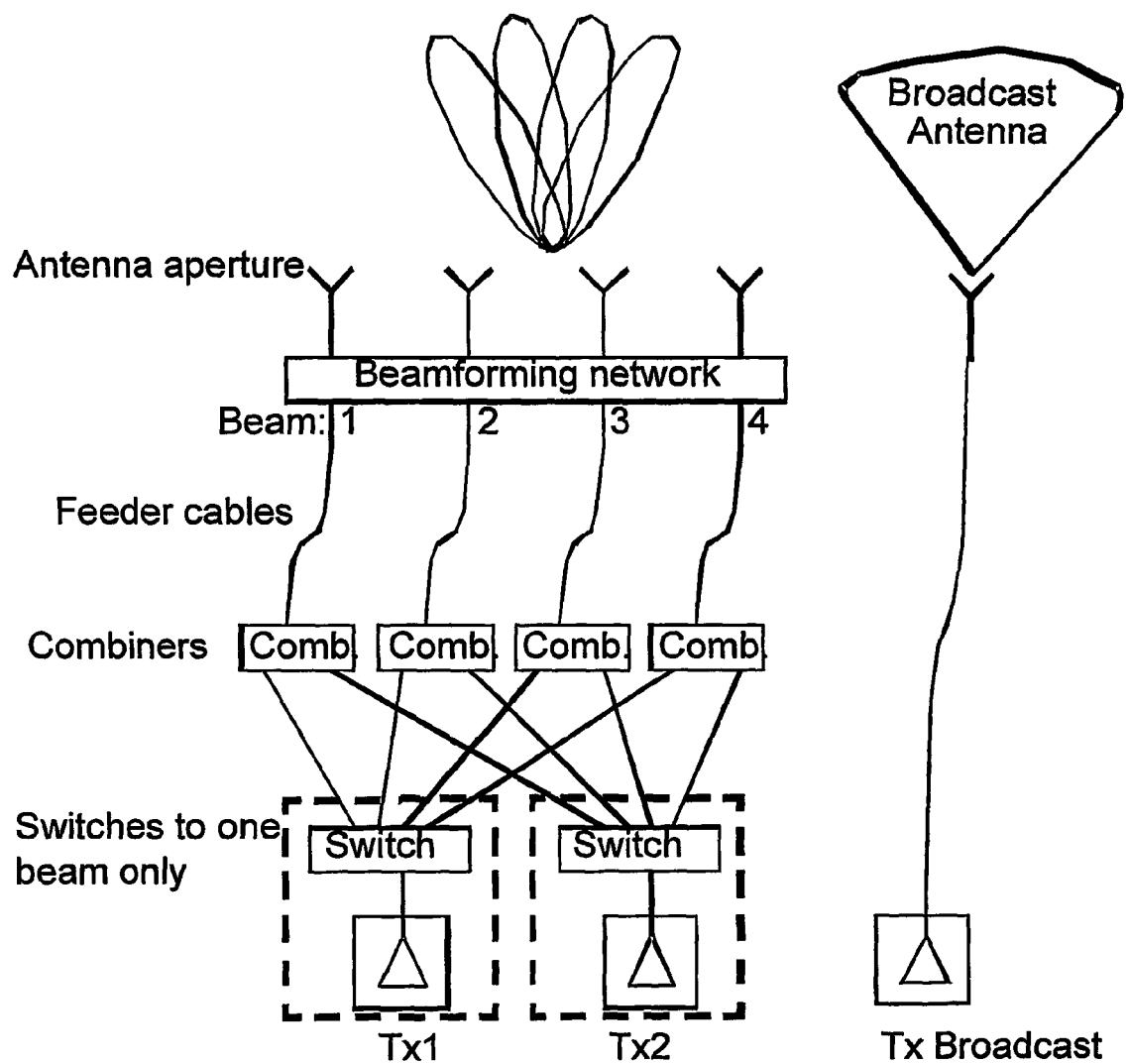
FIG. 4 shows a block diagram of multi-beam array with a separate broadcast antenna system.

In FIG. 2 is shown the block diagram for a typical multi-beam configuration, with the corresponding beam pattern shown in FIG. 3. In this configuration broadcast information is sent through a coherent combined radiation of signals. The other alternative for broadcast transmission, through a separate antenna system, with separate feeder is shown in FIG. 4.

Broadcast information is transmitted in two narrow-beams without signal coherency, simultaneously as transmitting dedicated information on separate narrow-beams.

Figure 5:
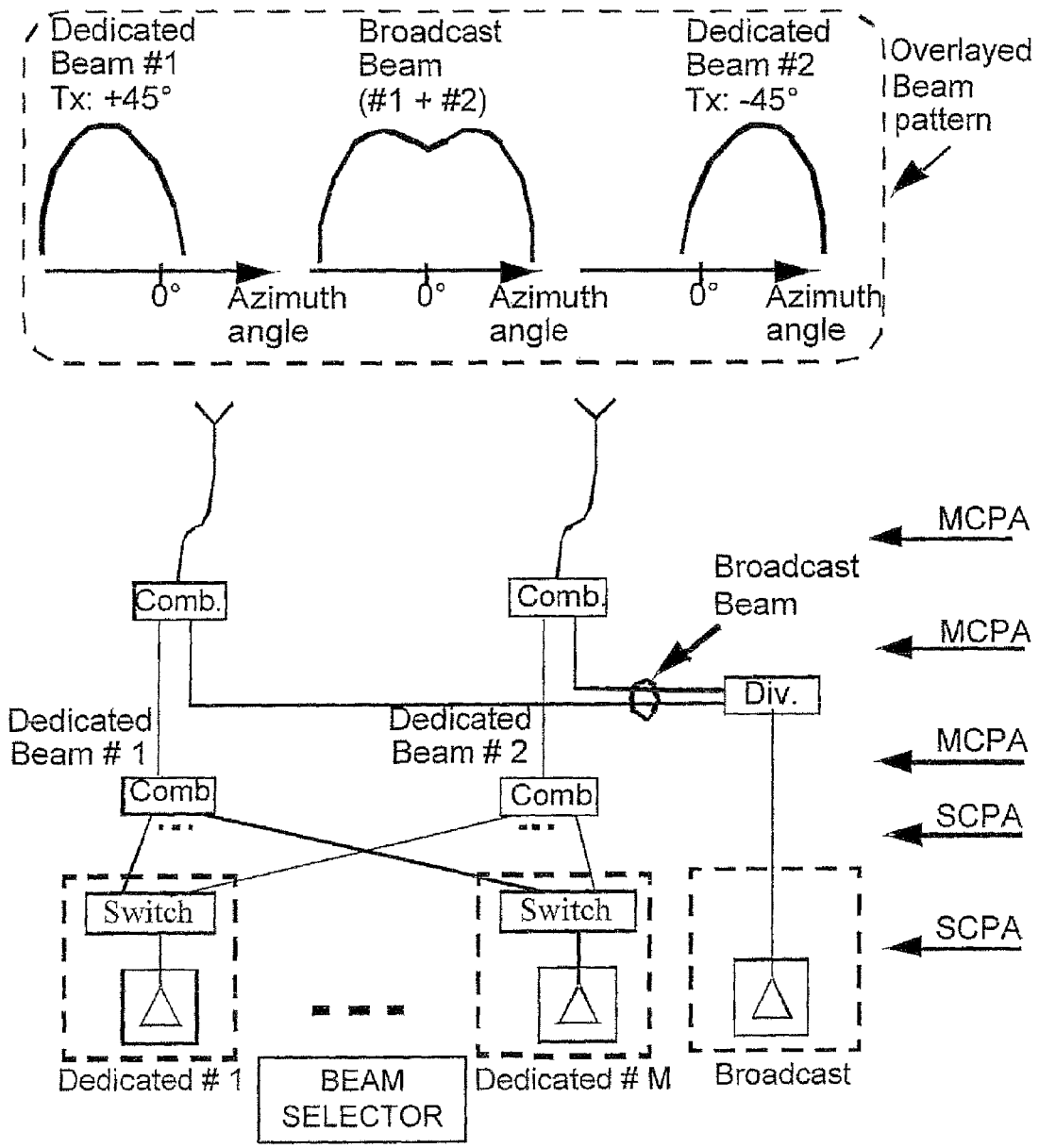
FIG. 5 shows a block diagram of the solution with two fixed-beam TX-diversity including resulting overlaying beam patterns according to an example embodiment.
Figure 6:
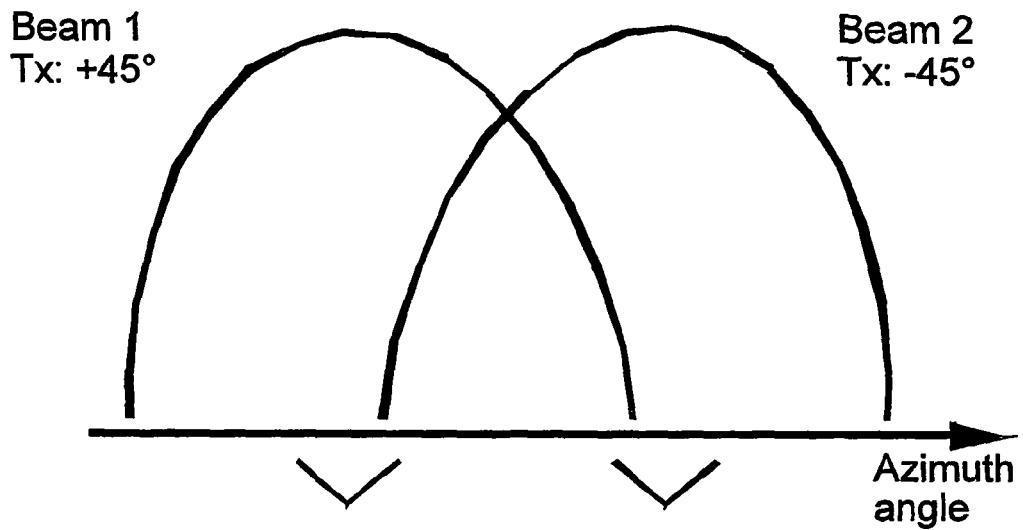
FIG. 6 illustrates a schematic drawing of the two fixed narrow-beam patterns of the solution with two fixed-beam TX diversity.

The main property utilized for maintaining cell-coverage pattern control when radiating in two beams simultaneously, is to use orthogonal polarization orientation for the two beams. The two orthogonal polarization directions can e.g. be linear polarization slanted .+−.45.degree. An example of a block diagram principally describing an example transmitter for two beams is shown in FIG. 5, and an example of the corresponding beam patterns for the two narrow-beams is shown in FIG. 6.

Figure 7:
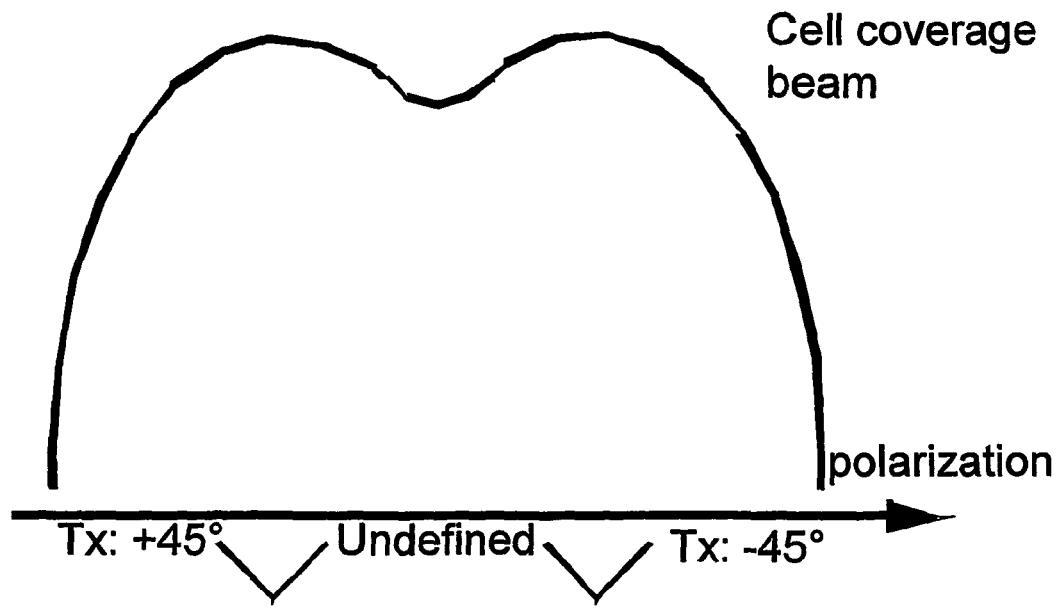
FIG. 7 is a schematic drawing of the cell coverage beam pattern according to an example embodiment wherein two time synchronized signals feeds the antenna solution giving an undefined polarization state in the region between the two narrow-beams.

For two time-synchronized signals, there may be a shift of signal polarization direction in the overlapping region between the two beams, but signal level will remain at an expected level as shown schematically in FIG. 7. Accordingly there does not exist any coherency requirement between different polarization planes.

For two-signal time unsynchronized, the polarization of each set of beams will remain, and the signals from the two beams will be independent in the two original beam patterns.

As a consequence, in the overlapping beam region, independent of time and phase relation, the transmitted signal in the two beams will be added in the receiver creating the cell-coverage pattern.

Referring to FIG. 5, signaling to a specific user #k is selected to be transmitted via a dedicated channel over two dedicated narrow-beams (#1 or #2). The selection of beams (by a beam selector shown in 5) is based upon directional/angular/spatial information, which may be obtained from joint uplink transmission related to the specific user #k. Based upon this narrow-beam selection for the specific user #k at a time instant (adaptively updated decision), the signal to be transmitted is directed/switched to a combining unit. In this unit all active dedicated users selected for transmission over the specific narrow-beam (i.e., #1 or #2) are combined. The transmission of the combined signals from all narrow-beam #1 selected users are simultaneous with the transmission of the combined signals from all narrow-beam #2 selected users, i.e. both narrow-beams are active with different users signal at each time.

Figure 8:
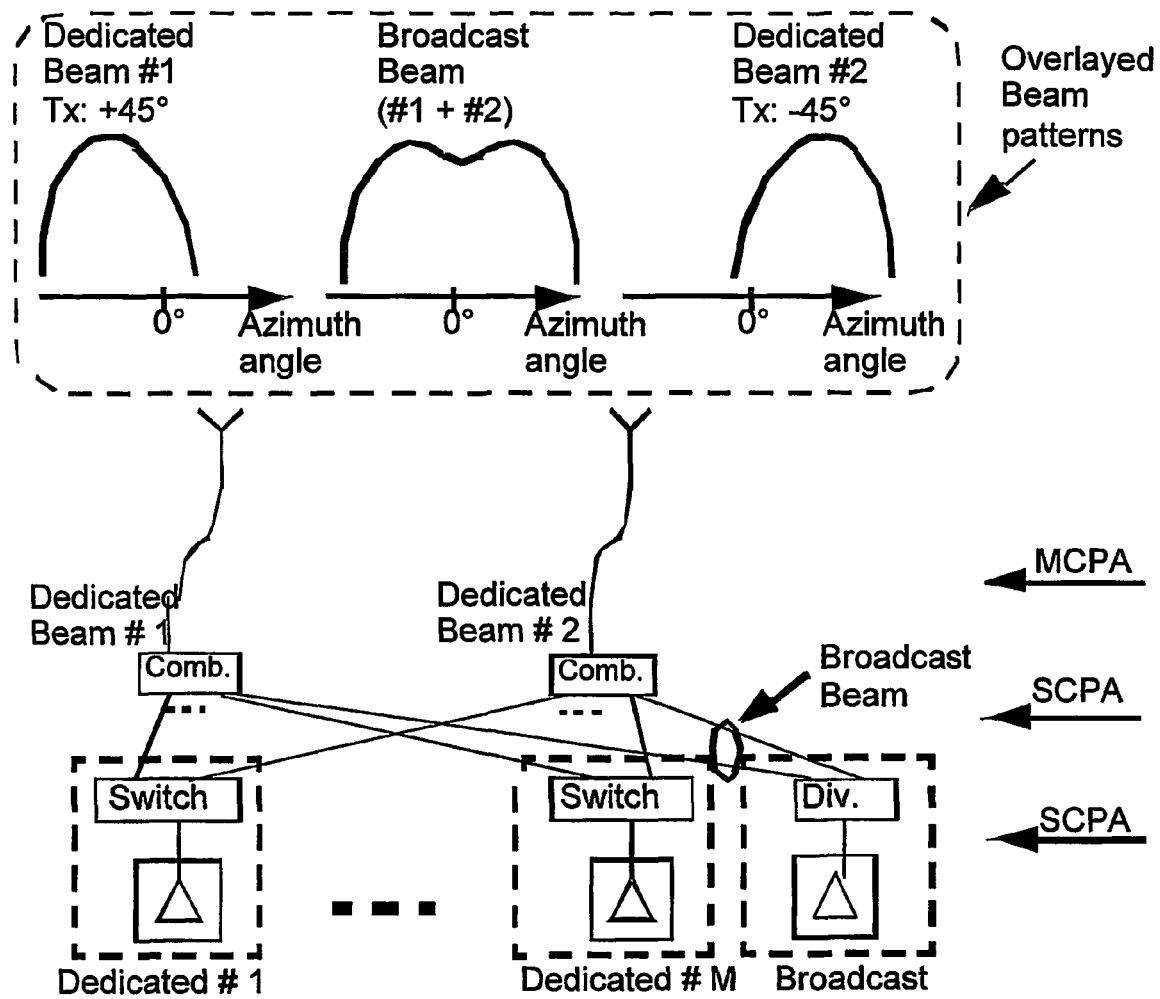
FIG. 8 shows a block diagram of the solution with two fixed-beam TX-diversity according to one alternative example embodiment, with resulting overlaying beam patterns.

In parallel to the described dedicated beam transmission, broadcast trans-mission needs to be conveyed defining the total cell coverage area. The total cell coverage area shall be matched by the coverage of the two fixed narrow-beams. The broadcast signal transmission is divided into two signal streams/paths, one for each of the two narrow-beams (no coherency requirements exists between the two parallel signal streams/paths). The two broadcast signal streams/paths are combined in combining units with the dedicated combined signals from all narrow-beam selected users in each of the two branches. The signals to the two antennas are then transmitted with in principal orthogonal polarization. An alternative solution is to combine dedicated users signals selected for transmission over the specific narrow-beam (#1 or #2) together with the associated broadcast signal stream in the same combiner unit, see FIG. 8.

The above described switching and combination of the broadcast and all dedicated signals are preferable handled in base-band processing. This is of course possible to do either in analog or digital domain or combinations thereof. However, the switching and combining is preferable handled in the digital domain. Alternatively, all or part of the switching and combining of the described signals can be performed at IF (intermediate frequency) or RF (radio frequency).

When and if RF components are introduced, a number of different power amplifiers (PA) positions are possible. After combination of several signals, linearity requirements is increased on the power amplifiers and handled by so called Multi-Carrier Power Amplifiers (MCPA). Before combination, so-called Single-Carrier Power Amplifiers (SCPA) are sufficient as the linearity requirements are less severe. The number of amplifiers needed is reduced for each level of combination of signals. But, of course the total requirement of output power is increased per amplifier for each level of signal combination.

Due to the losses in the switching and combining components it can be advantageous and preferred to locate the PA's as late as possible in the transmit chain. As example, possible MCPA locations are indicated in FIG. 5 and in FIG. 8.

It is essential that the system can make transmit beam selections based upon directional/angular/spatial information. One alternative is to get this information from the associated uplink transmission from the user.

For such an alternative, one example is to require overlaid beams (same beam direction) in both uplink and downlink to cover the same area. The innovation presented here may have orthogonal oriented polarization planes (e.g. linear polarization slanted .+-.45.degree.) for uplink and downlink in each angular beam direction, as described in, but in principle the proposed transmission solution does not impact the selection of receiver method.

The main objective is to support/enable enhanced capacity/ coverage for the downlink transmission direction. However, from a system perspective it is in principal essential to have capacity/coverage link balance between the two communication directions. If no link balance can be supported, one link will limit the capacity/coverage of the system and available performance for the non-limiting link can not be utilized. Implementing the proposed solution for the downlink, it may be important to also improve the uplink such that the enhanced capacity in the downlink can be utilized.

Figure 9:
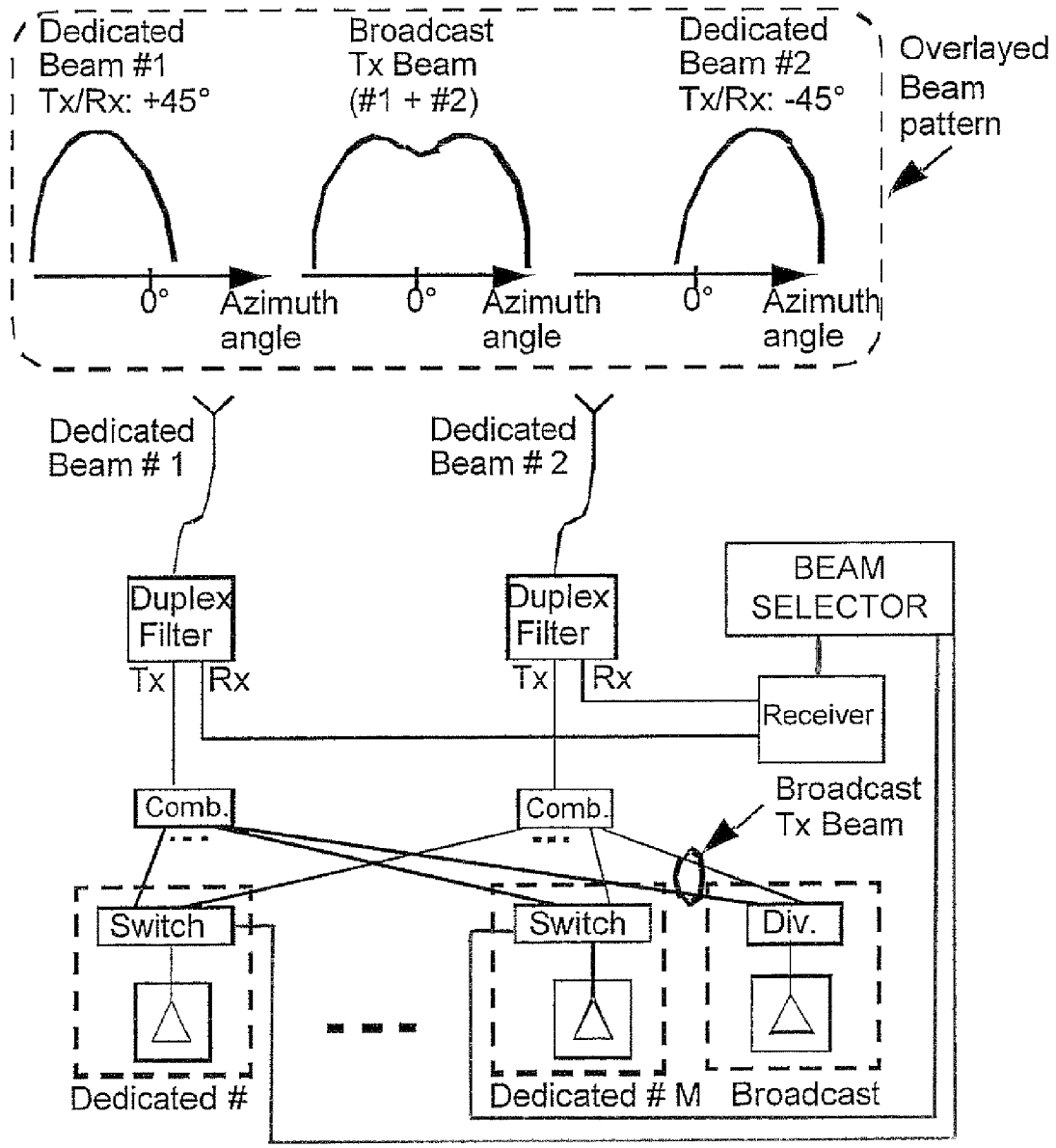
FIG. 9 shows a block diagram of the solution with two fixed-beam TX- and RX-diversity according to another alternative example embodiment, utilizing duplex filters.

A preferred configuration, to improve the uplink communication link, is to use the same dedicated beams in up-link and downlink. The uplink and downlink signals are separated in duplex filters attached to each of the dedicated beam feeders, according to FIG. 9. The feeder cables for each beam carries both the uplink and downlink information. With this solution, two uplink signals are received from the two beam directions and diversity reception can be made. FIG. 9 further shows that the two uplink signals are applied to a receiver which is connected to a beam selector. The beam selector uses the directional/angular/spatial information obtained from the two uplink signals to make beam selections. To this end, beam selector is connected to the switches.

Figure 10:
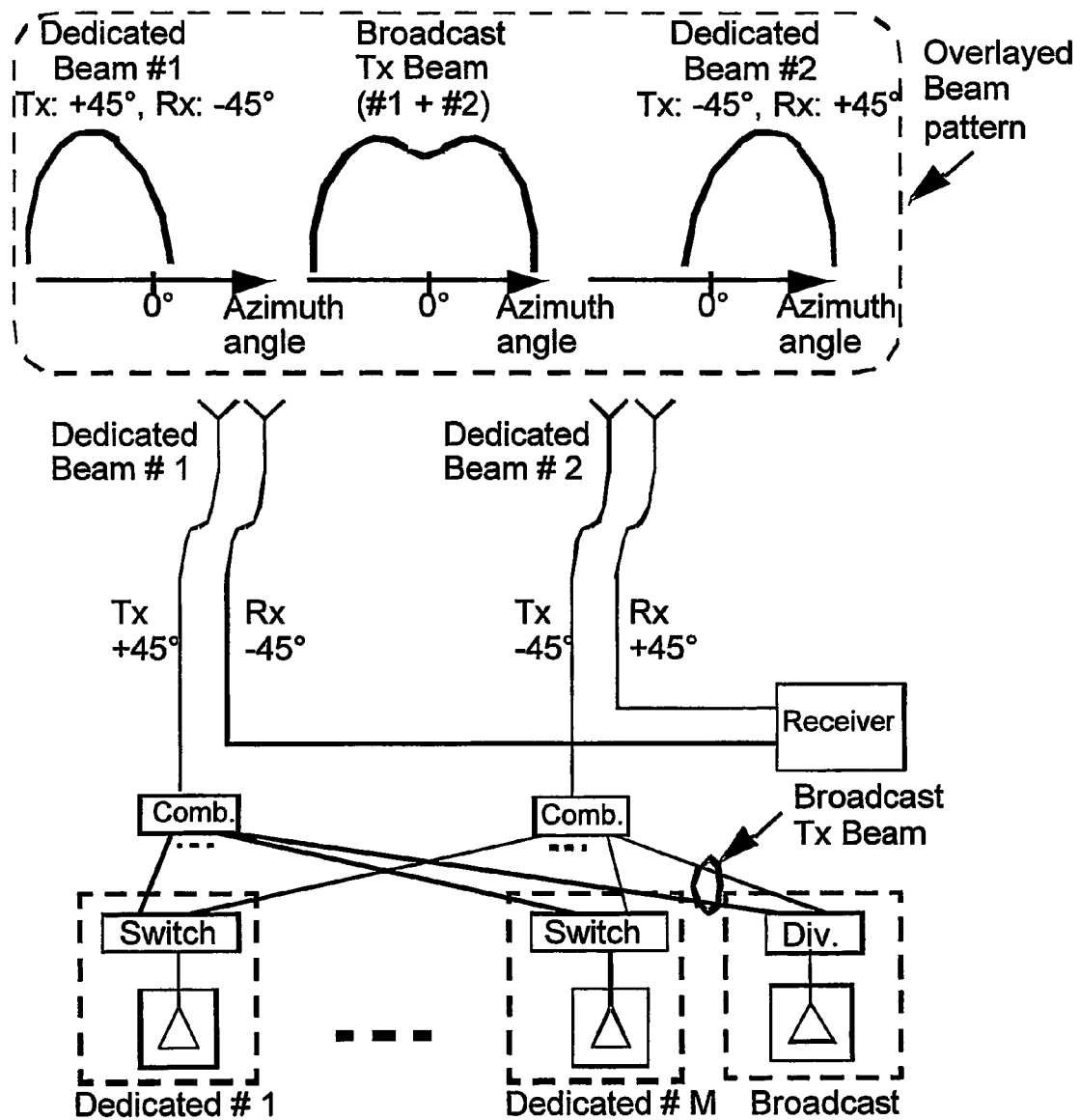
FIG. 10 shows a block diagram of the solution with two fixed-beam TX- and RX-diversity according to still an alternative example embodiment, without duplex filters.

An alternative configuration is to use overlaid beams in both up- and down-link that covers the same area, but have orthogonal oriented polarization planes (e.g. linear polarization slanted ±45°). With this solution the dedicated beam direction #1 have one polarization orientation in uplink (e.g. −45°) and the orthogonal oriented polarization in downlink (e.g. +45°). For beam direction #2 the opposite polarization directions are used, according to FIG. 10. In this solution separate feeder cables carries the up-link and downlink information.

In both discussed configurations, two uplink signals are received from the two beam directions and diversity reception can be made. The uplink solutions exemplified in FIG. 9 and FIG. 10, can be used with any downlink solution, not limited to the one shown in the Figures.

Figure 11:
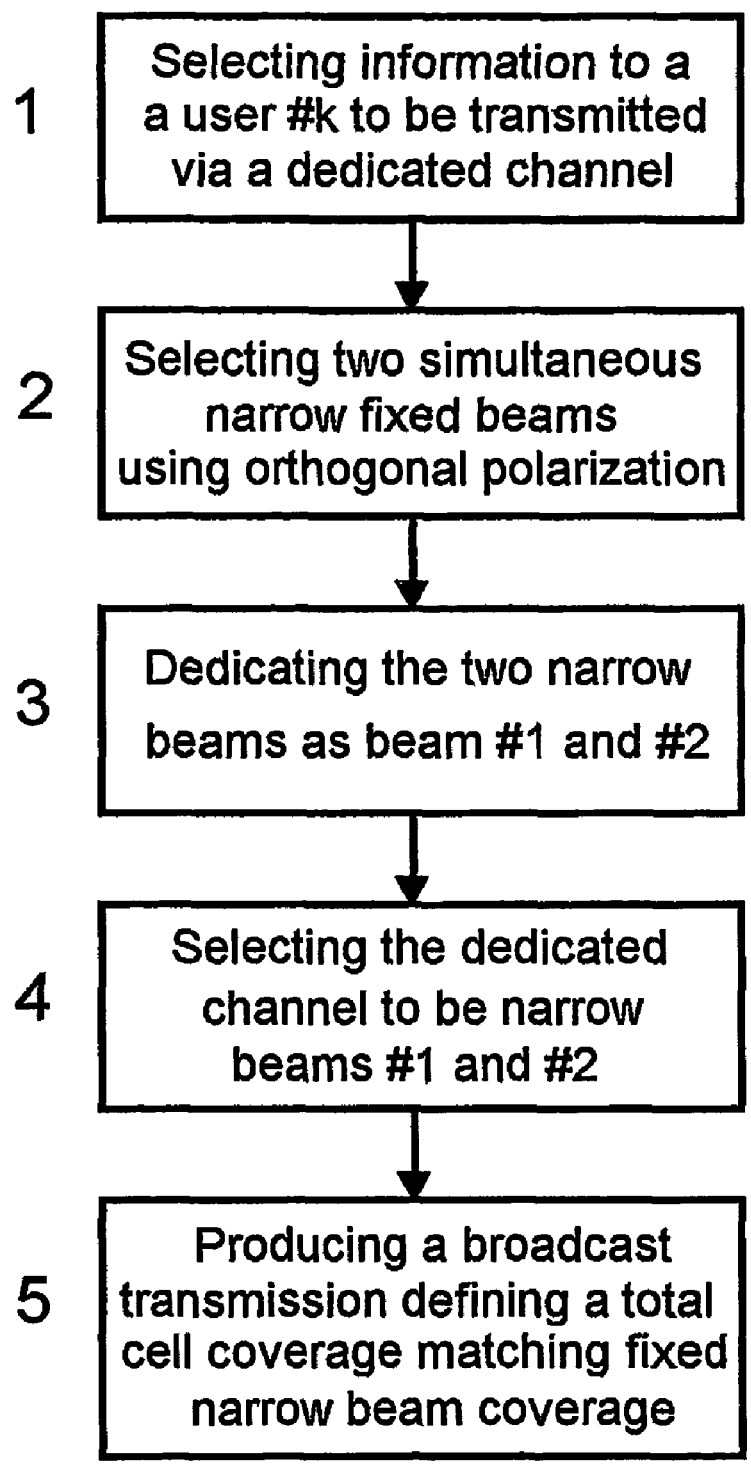
FIG. 11 illustrates an illustrative flow diagram of an example method.

In FIG. 11 is presented a flow diagram, which generally illustrates the proposed method in accordance with an example embodiment. Five acts 1 to 5 are applied for transmitting signals into a dedicated cell and at the same time producing a broadcast signal defining total cell coverage of a cellular system and still utilizing narrow-beams and non-coherent signal paths.

Assuming antennas with the same height, the proposed uplink diversity configuration will have a directivity gain of approximately 3 dB compared to a conventional sector coverage system. This additional directivity gain is due to that the beam covers approximately half the azimuth angular region (half the cell).

In a noise-limited environment, the proposed uplink diversity configuration will also give diversity gain from the 2 antenna branches. When the channel angular spread is rich, higher diversity can be expected. In total, the directivity and diversity gains of the proposed configuration is expected to outperform traditional and conventional sector coverage space or polarization diversity configuration. This is especially true for broadband type of systems like WCDMA.

Further, in an interference-limited environment, the proposed uplink diversity configuration will also give additional interference suppression of approximately 3 dB in an environment with uniformly spread users. This additional interference suppression is due to that the beam cover approximately half the azimuth angular region (antenna pattern suppresses users from half the cell). In CDMA based systems, the gain from the interference suppression is especially valuable, since users using the same frequency channel/spectrum are co-located in the same cell.

In the proposed solutions, downlink beams directed at different azimuth angles are discussed. The implementation of the antenna for creating these beams can either be made with separate antenna units or using one antenna unit giving all the needed beams.

Separate antennas for the two beams can typically be two conventional antennas with proper polarization directions. The two antennas can mechanically be directed/oriented towards the designed dedicated beam directions. Alternatively, the two separate antenna units may as well be positioned within a single enclosure, where the individual antenna unit either is pre-directed or can be mechanical directed within the enclosure.

In the implementation using one antenna unit (where the same structure is used for both beams), a preferred solution uses an array antenna with beam-forming means (feed network for example Butler-matrix). In the simplest form the array have two columns with two polarization directions each.

Feeding these two columns with separate but equal beam-forming network for each polarization, give common dedicated beam directions for up- and downlink suitable for all exemplified proposed invention solutions.

Independent of selected antenna implementation, the total beam-form (beam-width, beam-direction, etc.) can be optimized for cell-coverage of omni-radiating sites, 3-sector sites, 6-sector sites, etc., giving overall good performance.

Potential performance (capacity/coverage) advantages of two fixed beams as a TX-div solution are facilitated by enabling simultaneous transmission for both cell and narrow-beam coverage. This is made in a cost efficient way avoiding coherency requirements in the signal paths of the base station.

In the proposed solution for WCDMA the amount of HW and requirements on the HW is equal to or lower than the requirements for the existing standardized conventional TX-div methods. The proposed solution is well in line to fit the current product development solutions/architecture.

The invention is valid in a solution with several antennas as well as for a single package antenna.

REFERENCES

[1] 3GPP, "Technical Specification 25.214: Physical Layer Procedures", www.3gpp.org
[2] Ulf Forssén et al., "Adaptive Antenna Array for GSM900/DCS1800", Proc. 44th Vehicular Technology Conference, Stockholm, June 1994.
[3] Bo Hagerman and Sara Mazur, "Adaptive Antennas in IS-136 Systems", Proc. 48th Vehicular Technology Conference, Ottawa, May 1998.
[4] B. Göransson, B. Hagerman, J. Barta, "Adaptive Antennas in WCDMA Systems—Link Level Simulation Results Based on typical User Scenarios", IEEE VTC 2000 Fall, Boston, Mass., September 2000.
[5] "Spatial Division Multiple Access Wireless Communication Systems", U.S. Pat. No. 5,515,378
[6] "Microstrip Antenna Array", Patent application WO-95/34102/European Patent EP 0 763 264.
[7] "Directional-beam generative apparatus and associated method", U.S. Pat. No. 6,301,238.

The invention claimed is:

1. A method for simultaneously transmitting signals into a cell of a cellular system utilizing narrow-beams and non-coherent signal paths, the method comprising:
    selecting an information signal to a specific user #k to be transmitted via a dedicated channel;
    using simultaneously two fixed narrow-beams from a single group of antenna elements having a number of fixed narrow beams #n, utilizing orthogonal polarization for the two fixed narrow-beams;
    dedicating the two fixed narrow-beams as beam #1 and beam #2;
    selecting the dedicated channel to be the dedicated fixed narrow-beam #1 or beam #2 based upon direction/angular/spatial information; and
    producing a broadcast signal transmission from said single group of antenna elements, said broadcast signal transmission defining a total cell coverage, the broadcast signal transmission matching the coverage of the fixed narrow-beams #n;
    dividing the broadcast signal transmission into separate broadcast signal streams, one for each of the two fixed narrow-beams; and
    wherein the antenna elements of the group which carry the two fixed narrow-beams also carry the broadcast signal information in separate narrow beams.

2. The method according to claim 1, further comprising combining the two broadcast signal streams in combining units with the dedicated combined signal from all fixed narrow-beam selected users #n in each of the two branches.

3. The method according to claim 1, alternatively combining dedicated user's signals selected for transmission over a specific fixed narrow-beam #1 or #2 together with an associated broadcast signal stream in a single combiner unit.

4. The method according to claim 1, further comprising utilizing as the two orthogonal polarization states linear polarization planes slanted at +45° and −45°, respectively.

5. An apparatus for simultaneous transmission of signals into a cell and narrow-beams utilizing non-coherent signal paths characterized in that
    a selected information signal to a specific user #k is transmitted via a dedicated channel;
    simultaneous two fixed narrow-beams out of a number of fixed beams #n, utilize orthogonal polarization states for two fixed narrow-beams;
    the two fixed narrow-beams dedicate a beam #1 and a beam #2;
    the dedicated channel selected is formed by dedicated fixed narrow-beam #1 or #2 is based upon direction/angular/spatial information;
    a broadcast signal transmission produced defines a total cell coverage, the broadcast signal transmission matching coverage of the fixed narrow-beams #n, the broadcast signal transmission being divided into separate broadcast signal streams, one for each of the two fixed narrow-beams;
    wherein antenna elements which carry the two fixed narrow-beams also carry the broadcast signal transmission in separate narrow beams.

6. The apparatus according to claim 5, characterized in that the broadcast signal transmission is divided into two broadcast signal streams, one for each of the two fixed narrow-beams.

7. The apparatus according to claim 6, characterized in that the two broadcast signal streams are combined in combining units with the dedicated combined signals from all fixed narrow-beam selected users #n in each of the two branches.

8. The apparatus according to claim 6, characterized in that dedicated user's signals selected for transmission over a specific fixed narrow-beam #1 or #2 are combined together with an associated broadcast signal stream in a single combiner unit.

9. The apparatus according to claim 5, characterized in that the two orthogonal polarization states used constitute linear polarization planes slanted at +45° and −45°, respectively.

10. A transmitter apparatus comprising:
    a divider for dividing broadcast signal information into a first broadcast signal information path and a second broadcast signal information path;
    an antenna group comprising a single group of antenna elements configured to provide a group of narrow beams;
    a beam selector configured to select from the group of fixed narrow beams, and in accordance with direction/angular/spatial information for a specific user, a first narrow beam or a second narrow beam for transmission of a selected information signal to the specific user;

a first combiner configured to combine the selected information signal with the broadcast signal information carried on the first broadcast signal information path into a first combined signal which is carried by the first narrow beam;

a second combiner configured to combine the selected information signal with the broadcast signal information carried on the second broadcast signal information path into a second combined signal which is carried by the second narrow beam;

wherein the single antenna group is configured to simultaneously transmit the first combined signal carried by the first narrow beam and the second combined signal carried by the second narrow beam utilizing non-coherent signal paths, the first narrow beam and the second narrow beam having orthogonal polarization states, and wherein the first narrow beam and the second narrow beam are used both for dedicated respective fixed narrow lobes and a broadcast lobe covering an entire coverage area of the antenna group; and wherein the antenna elements of the group which carry the first narrow beam and the second narrow beam also carry the broadcast signal information.

11. The apparatus of claim 10, further comprising a duplex filter configured to obtain the direction/angular/spatial information for the specific user on an uplink transmission received by at least one of the first antenna and the second antenna.

12. The apparatus of claim 10, further comprising a switch which applies the selected information signal to both the first combiner and the second combiner.

13. The apparatus of claim 10, wherein the two orthogonal polarization states used constitute linear polarization planes slanted at +45° and −45°, respectively.

14. The apparatus of claim 10, further comprising a single carrier power amplifier (SCPA) configured to amplify an input: to one of the first combiner and the second combiner.

15. The apparatus of claim 10, further comprising a multi-carrier power amplifier (MCPA) configured to amplify an output to one of the first combiner and the second combiner.

16. The apparatus of claim 10, wherein the antenna group comprises a first antenna element associated with the first narrow beam and a second antenna element associated with the second narrow beam.

17. The apparatus of claim 16, wherein the antenna unit comprises beam forming means.

18. The apparatus of claim 10, wherein the antenna group comprises an antenna unit configured to provide both the first narrow beam and the second narrow beam.

19. The apparatus of claim 10, wherein transmission of the broadcast signal matches the coverage of the fixed narrow-beams comprising the group of narrow beams.

20. A method for simultaneously transmittimg signals into a cell of a cellular system utilizing narrow-beams, the method comprising:

selecting from a group of fixed narrow beams, and in accordance with direction/angular/spatial information for a specific user, a first narrow beam or a second narrow beam for transmission of a selected information signal to the specific user;

for a first group of plural users, combining respective plural dedicated channels into first Combined dedicated signals;

for a second group of plural users, combining respective plural dedicated channels into second combined dedicated signals;

dividing a broadcast signal into a first broadcast signal stream and a second broadcast signal stream;

combining the first broadcast signal stream and the first combined dedicated signals to form a first narrow beam combined signal for transmission as the first narrow beam by a first antenna element;

combining the second broadcast signal stream and the second combined dedicated signals to form a second narrow beam combined signal for transmission as the second narrow beam by a second antenna element;

transmitting the first narrow beam combined signal and the second narrow beam combined signal with orthogonal polarization with respect to one another, the first antenna element and the second antenna element comprising a same group of antenna elements;

wherein the first combined dedicated signals are carried to the first antenna element by a first signal path; wherein the second combined dedicated signals are carried to the second antenna element by a second signal path; and wherein the first signal path and the second signal path are non-coherent.

21. A transmitter comprising:

a divider configured to divide a broadcast signal into a first broadcast signal stream and a second broadcast signal stream;

selecting from a group of fixed narrow beams, and in accordance with direction/angular/spatial information for a specific user, a first narrow beam or a second narrow beam for transmission of a selected information signal to the specific user;

a first combiner configured to combine first combined dedicated signals and the first broadcast signal stream to form a first narrow beam combined signal, the first combined dedicated signals comprising plural dedicated channels for a first group of respective plural users;

a second combiner configured to combine second combined dedicated signals and the second broadcast signal stream to form a second narrow beam combined signal, the second combined dedicated signals comprising plural dedicated channels for a second group of respective plural users;

an antenna element group comprising a first antenna element and a second antenna element, the first antenna element being configured to transmit the first narrow beam combined signal, the second antenna element being configured to transmit the second narrow beam combined signal with orthogonal polarization with respect to the first narrow beam combined signal; and wherein the first antenna element and the second antenna element which respectively carry the first narrow beam and the second narrow beam also carry the broadcast signal information;

a first signal path configured to carry the first combined dedicated signals to the first antenna element and a second signal path configured to carry the second combined dedicated signals to the second antenna element; and wherein the first signal path and the second signal path are non-coherent.

* * * * *

UNITED STATES PATENT AND TRADEMARK OFFICE
CERTIFICATE OF CORRECTION

| | | |
|---|---|---|
| PATENT NO. | : 7,970,348 B2 | Page 1 of 1 |
| APPLICATION NO. | : 10/496644 | |
| DATED | : June 28, 2011 | |
| INVENTOR(S) | : Hagerman et al. | |

It is certified that error appears in the above-identified patent and that said Letters Patent is hereby corrected as shown below:

In Column 3, Line 14, delete "into the" and insert -- into two --, therefor.

In Column 3, Line 14, delete "two" and insert -- the two --, therefor.

In Column 4, Line 11, delete "station," and insert -- station --, therefor.

In Column 4, Line 58, delete "5)" and insert -- FIG. 5) --, therefor.

In Column 5, Line 5, delete "trans-mission" and insert -- transmission --, therefor.

In Column 5, Line 52, delete "in," and insert -- in Fig. 9, --, therefor.

In Column 9, Line 42, in Claim 14, delete "input:" and insert -- input --, therefor.

In Column 9, Line 58, in Claim 20, delete "transmittimg" and insert -- transmitting --, therefor.

In Column 10, Line 2, in Claim 20, delete "Combined" and insert -- combined --, therefor.

Signed and Sealed this
Twentieth Day of March, 2012

David J. Kappos
*Director of the United States Patent and Trademark Office*